US012809195B2

(12) United States Patent
Kalkavage et al.

(10) Patent No.: US 12,809,195 B2
(45) Date of Patent: Nov. 24, 2026

(54) ENDLESS OPTICAL POLARIZATION CONTROL ALGORITHM

(71) Applicant: General Dynamics Mission Systems, Inc., Fairfax, VA (US)

(72) Inventors: Jean Kalkavage, Columbia, MD (US); Dustin Nicholes, Edgewater, MD (US); Juan Juarez, Ellicott City, MD (US)

(73) Assignee: GENERAL DYNAMICS MISSION SYSTEMS, INC., Fairfax, VA (US)

( * ) Notice: Subject to any disclaimer, the term of this patent is extended or adjusted under 35 U.S.C. 154(b) by 363 days.

(21) Appl. No.: 18/490,977

(22) Filed: Oct. 20, 2023

(65) Prior Publication Data

US 2025/0130445 A1 Apr. 24, 2025

(51) Int. Cl.
*G02F 1/01* (2006.01)

(52) U.S. Cl.
CPC .......... *G02F 1/0136* (2013.01); *G02F 1/0102* (2013.01)

(58) Field of Classification Search
None
See application file for complete search history.

(56) References Cited

U.S. PATENT DOCUMENTS

| | | | | | |
|---|---|---|---|---|---|
| 6,384,956 | B1 * | 5/2002 | Shieh | G02F 1/0136 | 359/256 |
| 7,067,795 | B1 * | 6/2006 | Yan | H04J 14/02 | 250/225 |
| 7,917,031 | B2 * | 3/2011 | Boffi | H04J 14/06 | 398/81 |
| 2002/0191265 | A1 * | 12/2002 | LaGasse | G02F 1/0136 | 359/246 |
| 2003/0156784 | A1 * | 8/2003 | Cussat-Blanc | H04B 10/2916 | 385/24 |
| 2004/0184491 | A1 * | 9/2004 | Wai | G02F 1/0136 | 372/27 |
| 2006/0262396 | A1 * | 11/2006 | Smith | G02B 6/4246 | 359/489.08 |
| 2007/0070501 | A1 * | 3/2007 | Wen | G02B 27/286 | 359/490.02 |
| 2011/0158579 | A1 * | 6/2011 | Little | G02B 6/126 | 385/11 |

OTHER PUBLICATIONS

Andreas Weber, Brian L Heffner, David W. Dolfi, and Patrick Chou, "Reset-free system for real-time polarization control and synthesis," Appl. Opt. 31, 7180-7182 (1992).*

(Continued)

*Primary Examiner* — Ryan Crockett
(74) *Attorney, Agent, or Firm* — Ingrassia Fisher & Lorenz, LLP

(57) ABSTRACT

A polarization controller including a plurality of electronically controllable waveplates for altering a polarization of the randomly polarized optical signal in response to at least one of the plurality of dithered control signals to generate a controlled polarized optical signal and a detector for detecting the controlled polarized optical signal, for determining a polarization contribution for each of the plurality of electronically controllable waveplates in response to the controlled polarized optical signal and the plurality of unique frequency dithering signals and to determine a plurality of updated control voltage values in response to the polarization contribution for each of the plurality of electronically controllable waveplates.

9 Claims, 4 Drawing Sheets

100

(56) References Cited

OTHER PUBLICATIONS

T. Pfau et al., "Ultra-Fast Adaptive Digital Polarization Control in a Realtime Coherent Polarization-Multiplexed QPSK Receiver," OFC/NFOEC 2008—2008 Conference on Optical Fiber Communication/National Fiber Optic Engineers Conference, San Diego, CA , USA, 2008, pp. 1-3 (2008).*

* cited by examiner

300

ENDLESS OPTICAL POLARIZATION CONTROL ALGORITHM

TECHNICAL FIELD

The technical field relates generally to fiber optic communication systems and more particularly relates to methods and apparatus for providing real time polarization control for a plurality of electronically controllable waveplates using a polarization control algorithm for simultaneously adjusting each of the waveplates.

BACKGROUND

Real-time polarization control in a fiber optic system can be achieved using a variety of methods, including polarization controllers, waveplates and polarization maintaining fibers. Polarization controllers use electro-optic or liquid crystal technology to rotate the polarization of light. They can be used to adjust the polarization of a light beam in real time, allowing for precise control of the polarization state of the signal. Waveplates are typically made of birefringent materials that can rotate the polarization of light by a specific angle. They can be used in combination with polarization controllers to achieve more precise control of the polarization state of the signal. Polarization maintaining fibers typically have a built-in birefringence that causes the polarization of light to remain constant as it travels through the fiber. This can be useful for applications where the polarization state of the signal must be preserved, such as in quantum communication systems.

The specific method used to provide real-time polarization control in a fiber optic system depends on the specific application. For example, polarization controllers may be used in telecommunications systems to ensure that the polarization of the signal is correct for the receiver. Waveplates may be used in optical imaging systems to adjust the polarization of light for different imaging applications. Real-time polarization control can improve the performance of fiber optic systems by reducing polarization-dependent losses and ensuring that the polarization state of the signal is correct for the application. Real-time polarization control can also be used to enhance the functionality of fiber optic systems by enabling new features, such as polarization multiplexing and polarization coding. Real-time polarization control can also increase the flexibility of fiber optic systems by allowing the polarization state of the signal to be adjusted in real time. This can be useful for applications where the polarization state of the signal must be changed dynamically, such as in optical communications systems.

Applications such as high-speed telecommunications networks, laboratory test instrumentation, optical interferometers for sensing and measurement, optical phased array transmitters or receivers, and coherent laser beam combining systems require fast polarization control for optimal performance. As the demand for high-speed optical systems grows, the need for real-time high-speed optical polarization controllers will also grow. Researchers are working to develop new polarization controllers that are faster, more accurate, and more robust to noise. These advances will help to ensure that real-time high-speed optical polarization controllers can meet the needs of future applications. Limitations on real-time high speed polarization controllers include bandwidth, dynamic range, speed and accuracy. Current commercial real time polarization controllers use a slow gradient descent algorithm and do not always succeed in finding the correct polarization state. A slow gradient descent algorithm for a multi-waveplate setup will step one of the control voltages by a fixed amount and then receive the feedback signal and compare the result to the desired state. The logic of gradient descent is used to change the voltage in the correct direction. Multiple voltages cannot be changed at the same time, since the information needed to make the decision of which way to move the voltage next would be obscured. This solution is typically a bottle neck on advancing product designs. In addition to these limitations, real-time high-speed optical polarization controllers can also be affected by noise and other environmental factors. These factors can degrade the performance of the polarization controller and limit its ability to control the polarization of light in real time. As such, it is desirable to address these problems and provide a robust solution for optical polarization control in a fiber optic or other optical applications. In addition, other desirable features and characteristics will become apparent from the subsequent summary and detailed description, and the appended claims, taken in conjunction with the accompanying drawings and this background.

SUMMARY

Disclosed herein are communications systems, communication algorithms, sensors, transmitters and receivers, and related control logic for provisioning endless optical polarization control systems, methods for making and methods for operating such systems, and other systems equipped with such transmitters, receivers, and controllers. By way of example, and not limitation, there is presented method and apparatus for providing a real time optical polarization controller employing a plurality of electronically controlled waveplates used to provide real time control of the polarization of light using an electric field. The exemplary system includes waveplates that are individually controlled by individually applied voltages each having a unique identifying characteristic, such as a dither of the input voltage with a known frequency, such that each of the individual waveplates can be adjusted simultaneously and the individual contributions of each waveplate to the overall polarization can be distinguished at an output of the polarization controller.

In accordance with an aspect of the present disclosure, a method for endless optical polarization control of a plurality of optical waveplates including generating, by a plurality of voltages sources, a plurality of control voltages, generating, by a plurality of frequency generators, a plurality of unique frequency dithering signals to combine with each of the plurality of control voltages to generate a plurality of dithered control voltages, wherein each of the plurality of dithered control voltages are dithered at one of the plurality of unique frequencies, a plurality of electronically controllable waveplates for altering a polarization of a randomly polarized optical signal in response to at least one of the plurality of dithered control signals to generate a controlled polarized optical signal, detecting, by an optical sensor, the controlled polarized optical signal, determining, by a polarization controller, a polarization contribution for each of the plurality of electronically controllable waveplates in response to the controlled polarized optical signal and the plurality of unique frequency dithering signals, determining, by the polarization controller, a plurality of updated control voltage values in response to the polarization contribution for each of the plurality of electronically controllable waveplates, and generating, by the plurality of voltage sources, a plurality of updated control voltages in response to the plurality of updated control voltage values and the plurality of electronically controllable waveplates for altering a polarization of a subsequent randomly polarized optical signal in response to the plurality of updated control voltages.

In accordance with another aspect of the present disclosure, a polarization controller including a first source for receiving a randomly polarized optical signal, a second source for receiving a data indicative of a reference signal, a plurality of variable voltage sources for generating a plurality of control voltages, a plurality of frequency generators for generating a plurality of unique frequency dithering signals to combine with each of the plurality of control voltages to generate a plurality of dithered control voltages, wherein each of the plurality of dithered control voltages are dithered at one of the plurality of unique frequencies, a plurality of electronically controllable waveplates for altering the polarization of the randomly polarized optical signal in response to at least one of the plurality of dithered control signals to generate a controlled polarized optical signal, a detector for detecting the controlled polarized optical signal, for determining a polarization contribution for each of the plurality of electronically controllable waveplates in response to the controlled polarized optical signal and the plurality of unique frequency dithering signals and to determine a plurality of updated control voltage values in response to the polarization contribution for each of the plurality of electronically controllable waveplates and the data indicative of the reference signal, the plurality of variable voltage sources being further configured for generating a plurality of updated control voltages in response to the plurality of updated control voltage values and the plurality of electronically controllable waveplates for altering a polarization of a subsequent randomly polarized optical signal in response to the plurality of updated control voltages.

In accordance with another aspect of the present disclosure, a polarization controller including a first signal source for generating a first dithering signal and a second signal source for generating a second dithering signal having a different frequency than the first dithering signal, a first lock-in amplifier for generating a first control voltage and an updated first control voltage and a second lock-in amplifier for generating a second control voltage and an updated second control voltage, a first electronically controllable waveplate for altering at least one of the phase and the retardation of an optical signal in response to a combination of the first control voltage and the first dithering signal, a second electronically controllable waveplate for altering at least one of the phase and the retardation of the optical signal in response to a combination of the second control voltage and the first dithering signal, and a photodetector for generating an electrical representation of the controlled polarized optical signal and wherein the first lock-in amplifier is further configured for generating the updated first control signal in response to the electrical representation of the controlled polarized optical signal and the second lock-in amplifier is further configured for generating the updated second control signal in response to the electrical representation of the controlled polarized optical signal, the first electronically controllable waveplate and the second electronically controllable waveplate further operative to adjust at least one of the phase and the retardation of a subsequent randomly polarized optical signal in response to the updated first control signal is mixed with the first dithering signal and the updated second control signal is mixed with the second dithering signal.

Other objects, advantages and novel features of the exemplary embodiments will become more apparent from the following detailed description of exemplary embodiments and the accompanying drawings.

BRIEF DESCRIPTION OF DRAWINGS

The above-mentioned and other features and advantages of this invention, and the manner of attaining them, will become more apparent and the system and method will be better understood by reference to the following description of embodiments of the invention taken in conjunction with the accompanying drawings.

Figure 1:
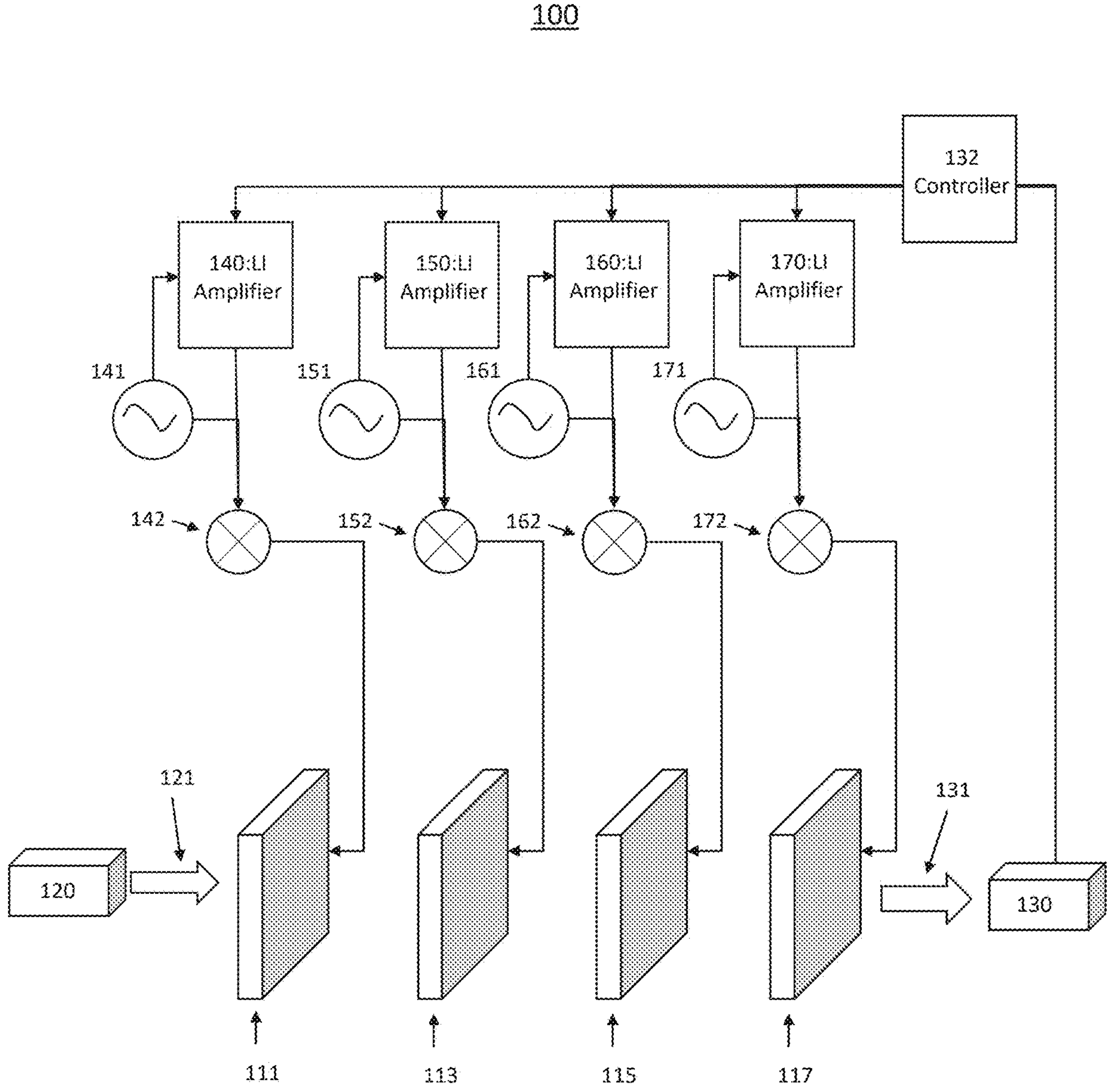
FIG. 1 illustrates an environment for use of an endless optical polarization control algorithm for adjusting a polarization controller whose phase retardation and angle of orientation can be actively controlled according to an exemplary embodiment of the present disclosure.

The exemplifications set out herein illustrate preferred embodiments of the invention, and such exemplifications are not to be construed as limiting the scope of the invention in any manner.

DETAILED DESCRIPTION

The following detailed description is merely exemplary in nature and is not intended to limit the invention or the application and uses of the invention. Furthermore, there is no intention to be bound by any theory presented in the preceding background or the following detailed description. Various non-limiting embodiments of polarization control systems, polarization control algorithms, and software are provided. In general, the disclosure herein describes a polarization control system employing a plurality of electronically controllable polarization controllers, such as rotatable waveplates and electronically variable retarders, and polarization detectors to provide real time polarization control for an optical system.

Real time, high speed optical polarization control is a requirement for many optical applications and increasing the speed of the optical polarization controller can greatly improve the performance of the overall system. A polarization controller is an optical device that modifies the polarization state of light. It can be used to control the polarization of light in optical fibers or other optical applications. In some exemplary embodiments, polarization controllers receive arbitrarily polarized input signals and transform the polarization of these signals to a known, desired polarization. In optical communications systems, polarization controllers are used to compensate for polarization-dependent losses in optical fiber links caused by the refractive index of optical fiber varying slightly with the polarization of light. This can cause different polarizations of light to travel at different speeds through the fiber, which can lead to signal attenuation. Polarization controllers can be used to adjust the polarization of light so that all polarizations travel at the same speed through the fiber, which can improve the performance of the link. This polarization controller can reduce signal attenuation in the system and help to improve system performance. As these changes in polarization can be random and time dependent, high-speed real-time polarization control is required to continuously adjust the polarization in order to endlessly optimize system performance.

In some exemplary embodiments, polarization controllers use waveplates to transform the type of polarization (linear to circular and vice versa) or rotate the angle of polarization (for example, linear horizontal to linear vertical) by delaying one polarization component of the light signal. Waveplate angle is an orientation of the optical axes of the waveplate relative to the input light. Waveplate retardance is an amount of phase shift imparted between perpendicular input polarization components. Waveplates can employ lithium niobate which is an electro-optically sensitive birefringent material that is commonly used for fiber-coupled polarization controllers.

Turning now to FIG. 1, an environment 100 for use of an endless optical polarization control algorithm for adjusting a polarization controller whose phase retardation and angle of orientation can be actively controlled according to an exemplary embodiment of the present disclosure is shown. The exemplary environment 100 includes an optical signal source 120, a first mixer 142, a first waveplate 111, a first lock-in amplifier 140, a first sinusoidal signal source 141, a second mixer 152, a second waveplate 113, a second lock-in amplifier 150, a second sinusoidal signal source 151, a third mixer 162, a third waveplate 115, a third lock-in amplifier 160, a third sinusoidal signal source 161, a fourth mixer 172, a fourth waveplate 117, a fourth lock-in amplifier 170, a fourth sinusoidal signal source 171, an optical signal detector 130 and a controller 132. In this exemplary embodiment, four electronically controllable waveplates are shown, however, any number of electronically controllable waveplates or static waveplates can be used in conjunction with each other where the number of waveplates is determined in response to design choices and performance criteria.

The exemplary polarization controller and associated algorithm uses gradient descent in conjunction with lock-in detection, where a dither signal is added to each of the controlling DC voltages and received through the detector 130, filtered to detect the dither frequency, and the power of the received dithered signal is used to determine how to change the corresponding DC voltage to drive to the desired state. This allows for a dither signal at a unique frequency to be applied to each waveplate and essentially allows for multiple feedback signals that each correspond to the action of a single waveplate. In contrast, currently available controllers have only one feedback signal. The result is a great increase in speed of the overall polarization control response.

In some exemplary embodiments, a randomly polarized optical signal 121 is received from the optical signal source 120. The optical signal source 120 can be an optical fiber for use in a fiber optic communications system or the like. Likewise, the optical signal source 120 may be a laser, or other data carrying light propagating through a medium such as air or the like. The randomly polarized optical signal 121 is propagated through each of the plurality of electronically controlled waveplates 111, 113, 115, 117 wherein each waveplate 111, 113, 115, 117 alters the polarization angle and/or retards the phase of the randomly polarized optical signal 121 such that a controlled polarized optical signal 131 results and is coupled to the optical signal detector 130.

The exemplary system 100 is configured to apply at least one control voltage to each of the electronically controlled optical waveplates 111, 113, 115, 117. At least one of the phase retardation or polarization angles are actively controlled by varying the one or more applied voltages. In some exemplary embodiments, the voltage-controlled waveplate can adjust the polarization angle of the incoming optical signal in response to a first control voltage as well as generating a variable retardation of the optical signal in response to a second control voltage. In response to the applied voltage, the waveplate alters the polarization state of a light wave of the randomly polarized optical signal 121 traveling through it. Waveplates are typically available with a retardance of $\lambda/4$ or $\lambda/2$, meaning that a phase shift of up to a quarter wavelength or a half a wavelength respectively is created.

A lock-in amplifier (LIA) 140, 150, 160, 170 is a type of amplifier that can extract a signal with a known carrier wave from an extremely noisy environment. Each of the LIAs 140, 150, 160, 170 are used to supply the control voltage to each of the voltage controlled waveplates. Each of these control voltages are coupled to a mixer 142, 152, 162, 172 to modulate, or dither, the control voltage with a sinusoidal signal having a unique frequency from one of the plurality of sinusoidal signal sources 141, 151, 161, 171. Typically, the frequencies of these sinusoidal signals can be between 400 khz and 1000 khz with an amplitude of around 100 mV. The dithered control voltages are applied to each of the waveplates 111, 113, 115, 117, either polarization shift or phase retardation, to alter the randomly polarized optical signal 121 traveling through it. This sinusoidal dithering can be detected at the optical signal detector 130, such that the individual contributions of each of the waveplates 111, 113, 115, 117 can be determined. In this manner, each of the applied voltages can be varied simultaneously and the effects on the optical signal can be determined. The controller 132 receives the output from the optical signal detector 130, determines the individual contributions of each of the waveplates, and generates a control signal for each of the LIAs 140, 150, 160, 170 to adjust the retardation of each of the waveplates simultaneously. This process is repeated until the desired controlled polarized optical signal 131 is achieved. The controller 132 can receive data from other data sources such that the polarization can be matched to another varying polarization signal or signal processor in real time.

Figure 2:
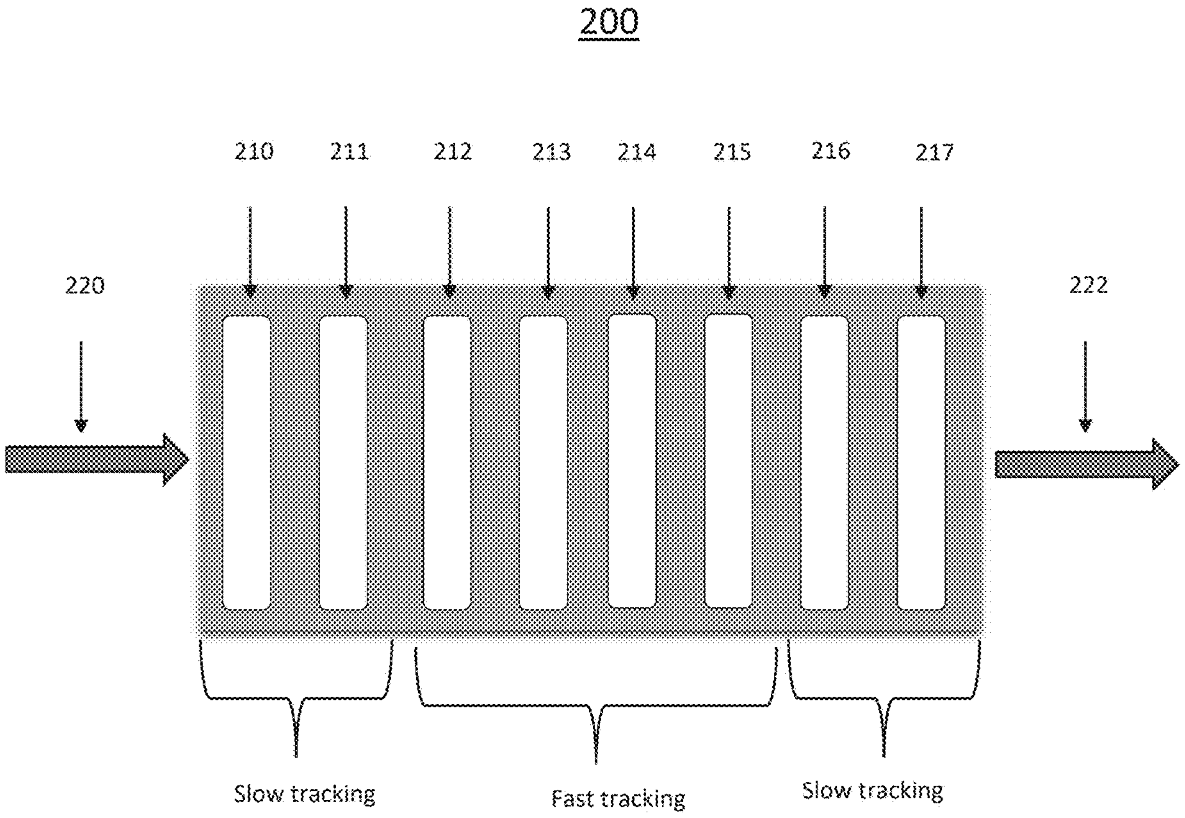
FIG. 2 illustrates a waveplate configuration for use of an endless optical polarization control algorithm condition according to an exemplary embodiment.

Turning now to FIG. 2, a waveplate configuration 200 for use of an endless optical polarization control algorithm condition according to an exemplary embodiment is shown. The exemplary waveplate configuration can include eight controllable waveplates including six quarter wave waveplates 210, 211, 212, 215, 216, 217 and two half wave waveplates 213, 214. In some exemplary embodiments, the waveplates are paired in the configuration with an identical redundant waveplate such that when a waveplate reaches its maximum range, the second paired waveplate can take over. Adding redundant polarization control stages allows one stage approaching its voltage control limit to hand tracking over to the redundant waveplate and be reset, while the polarization control system maintains control of the signal.

The exemplary waveplate configuration 200 is configured to receive a randomly polarized optical signal 220 and to produce a controlled polarized optical signal 222. In some exemplary embodiments, the first quarter wave waveplate 210, the second quarter wave waveplate 211, the fifth quarter wave waveplate 216, and the sixth quarter wave waveplate 217 can be controlled for slow tracking of polarization control stages. The third quarter wave waveplate 212, the fourth quarter wave waveplate 215 as well as the first half wave waveplate 213 and the second half wave waveplate 214 can be controlled for fast tracking of the polarization control stages. In some exemplary embodiments, each of the waveplates can be controlled for both waveplate angle and retardance, providing two degrees of freedom for each waveplate and 16 degrees of freedom overall.

Fast tracking allows the magnitude of waveplate polarization shift or phase retardation to be quickly changed in coarse increments. Conversely, slow tracking allows the magnitude of the waveplate polarization shift or phase retardation to be changed in finer increments. During tracking, the voltage of the fast tracking control loops can rail under certain circumstances. The redundant polarization control allows the slow tracking elements to compensate when the fast tracking elements hit the rail. Lock-in detection allows for constant variation of all elements simultaneously and converges on a solution much more quickly than a gradient descent algorithm The four fast tracking waveplate elements 212, 215, 213, 214 can use higher reference frequencies, such as 10 kHz to dither the control voltages. The LIAs can integrate over 2 full periods of the reference wave to maintain speed and update a proportional-integral-derivative (PID) control loop once at the end of the integration period. The slow tracking LIA/PID combinations can use slower reference frequencies, such as 1 kHz to dither the control voltages and integrate over closer to 50 periods of the reference wave, which is more time consuming. Applying the two different LIA reference frequencies to the two voltages of a single polarization control element varies angle and retardance simultaneously. This occurs because the two reference frequencies will beat against each other and vary both in offset and relative voltage. The LIA+PID combination can drive the light polarization to the correct state and track across changing input and target polarization states.

Figure 3:
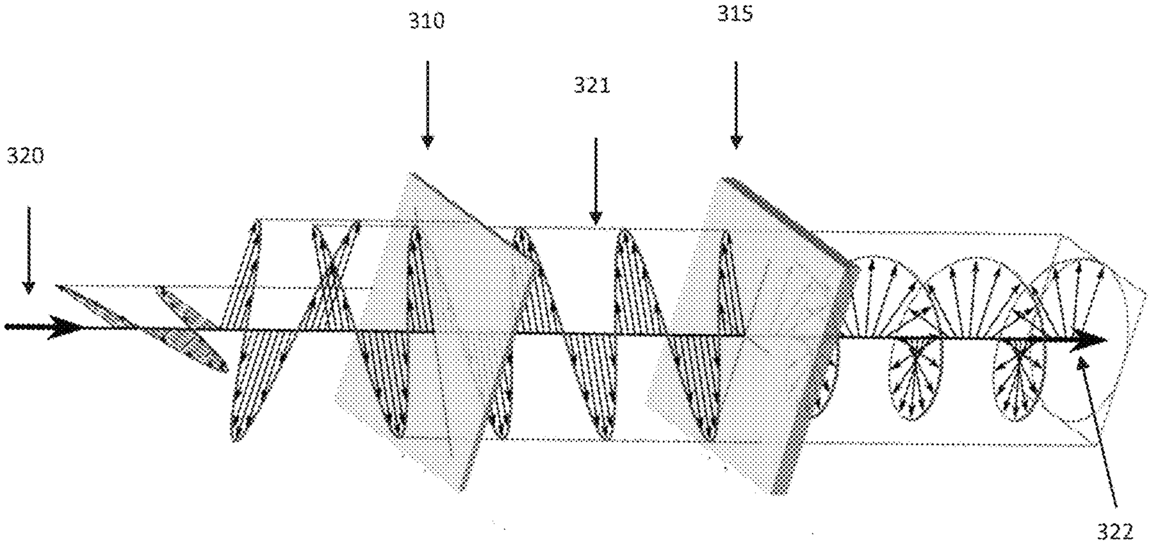
FIG. 3 illustrates an exemplary waveplate configuration according to an exemplary embodiment.

Turning now to FIG. 3, an exemplary waveplate configuration 300 according to an exemplary embodiment is shown. Waveplates transform the type of polarization, such as linear to circular, or rotate the angle of polarization, such as linear horizontal to linear vertical by delaying one polarization component of the light signal. The exemplary waveplate configuration 300 shows a linear polarizer 310 and a circular polarizer 315. A half wave waveplate can be configured as the linear polarizer 310 is operative to transform the unpolarized light 320 to linearly polarized light 321. The half wave waveplate for π (pi) retardance to rotate the orientation of linearly polarized light. A quarter wave waveplate can be configured as the circular polarizer 315 to transform the linearly polarized light 321 to a circularly polarized light 322. Using the quarter wave waveplate, π/2 retardance transforms linearly polarized light to circularly polarized light. Waveplate retardance corresponds to the amount of phase shift imparted between perpendicular input polarization components.

Figure 4:
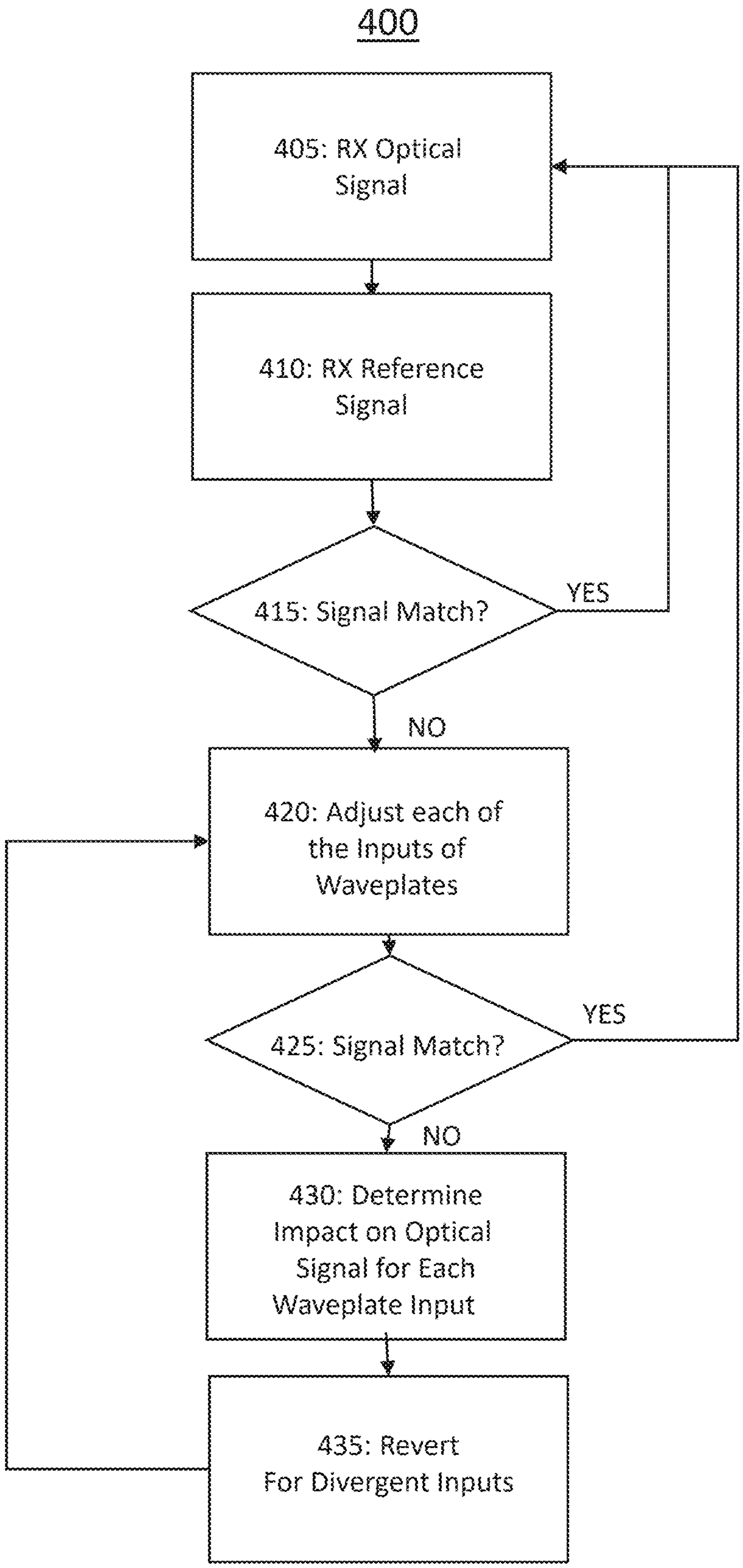
FIG. 4 shows a flow diagram illustrating a non-limiting embodiment of exemplary method for controlling a waveplate configuration using an endless optical polarization control algorithm condition according to an exemplary embodiment.

Turning now to FIG. 4, an exemplary method 400 for controlling a waveplate configuration using an endless optical polarization control algorithm condition according to an exemplary embodiment is shown. The exemplary method 400 is first configured to detect 405 a controlled polarized optical signal after the randomly polarized optical signal is propagated through each of the plurality of electronically controlled waveplates. Initially each of the electronically controlled waveplates may receive a control voltage from an amplifier such that the electronically controlled waveplate is adjusted to a center of an adjustable range or a predetermined default value.

The method is next operative to compare 410 the reference signal. The reference signal can be a separate, real time uncontrolled optical signal, wherein the controlled optical signal is used to track a polarization drift. Alternatively, the reference signal can be a desired and/or expected signal polarization. The reference signal can be received from a separate source or desired values of the reference signal can be retrieved from a memory or received as digital data or the like from a transmission source. For example, in some exemplary embodiments, a transmitter may transmit data indicative of a polarization of a transmitted signal. The receiver can then receive the randomly polarized optical signal and control the waveplates such that the resulting controlled polarized optical signal is corrected back to the originally transmitted signal polarization.

If the controlled polarized optical signal matches the reference signal 415, no waveplate control values are adjusted and the method returns to receiving the uncontrolled optical signal 405. If the controlled polarized optical signal and the reference signal to not match, each of the waveplate control voltages can be adjusted simultaneously. In some exemplary embodiments, the method may retrieve control voltage values for each of the waveplates from a lookup table stored in a memory in response to a difference between the reference signal and the controlled polarized optical signal. In some exemplary embodiments, the method may first detect the incoming, randomly polarized optical signal and determine a difference between the randomly polarized optical signal and the desired reference signal. In response to the difference, the method can then adjust 420 each of the voltage inputs for each of the waveplates.

After adjusting the control voltage for each of the waveplates, the method next redetermines 425 if the controlled polarized optical signal matches the reference signal. If the signals match, no waveplate control values are further adjusted and the method returns to receiving the uncontrolled optical signal 405. If the controlled polarized optical signal and the reference signal do not match, the method can next determine 430 the impact of each of the waveplates contributions to the controlled polarized optical signal. The contribution of each waveplate can be determined in response to a detection of the dithering frequency in the controlled polarized optical signal. With the control voltage that is input to an individual waveplate being slightly modulated by the dithering of the control voltage, the change in that waveplate's contribution to the controlled polarized optical signal will also vary around a central value at the same frequency. A detector and/or controller can determine the contribution of each of the waveplates in response to the various detected signal components in the controlled polarized optical signal at each of the dithering frequencies. In some exemplary embodiments, pairs of waveplates can have control voltages dithered with dithering signals of the same frequency. Under this configuration, the combined contributions of the pair of waveplates can be determined. The magnitude for each of the individual waveplates in a pair can be used to determine if the adjustment range of the waveplate has been railed or reached a maximum. The control voltages for each of the pairs of waveplates can be adjusted in response to the determined contributions of the pair of waveplates and the control voltage magnitudes for each of the individual waveplates of the pair. In some exemplary embodiments, the contribution of each waveplate can be determined and subsequent waveplate adjustments can be made in response to the preceding waveplate contribution.

After the contributions of each of the waveplates are determined the method can return 420 to adjusting each of the inputs of the waveplates.

In response to the determined impact of each waveplate on the controlled polarized optical signal, in some exemplary embodiments, the method can next revert waveplate control voltages that did not have a positive contribution to converging the controlled polarized optical signal to the reference signal. Waveplate control voltages that contribute positive contributions can be maintained while waveplates that make negative or negligible contributions can be reverted to the previous value. In some exemplary embodiments, waveplate control voltages returned to previous value can be next tuned in the opposite direction.

In some exemplary embodiments, pairs of waveplates can be combined as a single tuned pair such that when the first waveplate reaches a maximum, or rails, the second waveplate of the pair can take over. In response to the occurrence of a first waveplate control voltage reaching a maximum, the second waveplate can take over and the first waveplate may be reset to a tuned position within the tuning range.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those of ordinary skill in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

As used herein, the term processor refers to any hardware, software embodied in a medium, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that perform the described algorithms.

It is further noted that the systems and methods may be implemented on various types of data processor environments (e.g., on one or more data processors) which execute instructions (e.g., software instructions) to perform operations disclosed herein. Non-limiting examples include implementation on a single general-purpose computer or workstation, or on a networked system, or in a client-server configuration, or in an application service provider configuration. For example, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein. Other implementations may also be used, however, such as firmware or even appropriately designed hardware configured to carry out the methods and systems described herein. For example, a computer can be programmed with instructions to perform the various steps of the flowcharts described herein. The software components and/or functionality may be located on a single computer or distributed across multiple computers.

What is claimed is:

1. A method for polarization control of a plurality of optical waveplates comprising:

generating, by a plurality of voltages sources, a plurality of control voltages;

generating, by a plurality of frequency generators, a plurality of unique frequency dithering signals to combine with each of the plurality of control voltages to generate a plurality of dithered control voltages, wherein each of the plurality of dithered control voltages are dithered at one of the plurality of unique frequencies;

a plurality of electronically controllable waveplates for altering a polarization of a randomly polarized optical signal in response to at least one of the plurality of dithered control signals to generate a controlled polarized optical signal;

detecting, by an optical sensor, the controlled polarized optical signal;

determining, by a polarization controller, a polarization contribution for each of the plurality of electronically controllable waveplates in response to the controlled polarized optical signal and the plurality of unique frequency dithering signals;

determining, by the polarization controller, a plurality of updated control voltage values in response to the polarization contribution for each of the plurality of electronically controllable waveplates; and generating, by the plurality of voltages sources, a plurality of updated control voltages in response to the plurality of updated control voltage values and the plurality of electronically controllable waveplates for altering a polarization of a subsequent randomly polarized optical signal in response to the plurality of updated control voltages.

2. The method of claim 1 wherein the polarization contribution for each of the plurality of electronically controllable waveplates are determined simultaneously and wherein the plurality of updated control voltages are applied to the plurality of electronically controllable waveplates simultaneously.

3. The method of claim 1 wherein the plurality of electronically controllable waveplates includes eight waveplates and wherein four waveplates are slow tracking and four waveplates are fast tracking.

4. The method of claim 1 wherein the plurality of electronically controllable waveplates include six quarter wave electronically controllable waveplates and two half wave electronically controllable waveplates.

5. The method of claim 1 wherein each of the plurality of waveplates are electronically controllable waveplates.

6. The method of claim 1 wherein the plurality of electronically controllable waveplates includes eight waveplates including four functionally identical pairs of waveplates.

7. The method of claim 1 wherein the plurality of voltages sources are lock-in amplifiers and wherein each of the lock-in amplifiers are coupled to one of the frequency generators.

8. The method of claim 1 wherein the plurality of voltages sources are lock-in amplifiers and wherein the optical sensor is configured to couple the controlled polarized optical signal to each of the lock-in amplifiers.

9. The method of claim 1 wherein the plurality of voltages sources are lock-in amplifiers and wherein the each of the lock-in amplifiers is operative to isolate the polarization contribution of at least one of the plurality of the electronically controllable waveplates and generate at least one of the updated control voltages in response to the polarization contribution of the at least one of the plurality of the electronically controllable waveplates.

* * * * *